United States Patent [19]

Parrinello

[11] Patent Number: 5,393,379
[45] Date of Patent: Feb. 28, 1995

[54] WET LAID FIBEROUS THERMOPLASTIC MATERIAL AND AQUEOUS DISPERSION FOR PRODUCING SAME

[75] Inventor: Luciano M. Parrinello, Allison Park, Pa.

[73] Assignee: PPG Industries, Inc., Pittsburgh, Pa.

[21] Appl. No.: 52,296

[22] Filed: Apr. 22, 1993

Related U.S. Application Data

[63] Continuation of Ser. No. 622,671, Dec. 5, 1990, abandoned.

[51] Int. Cl.⁶ .............................................. D21H 13/40
[52] U.S. Cl. ..................................... 162/101; 162/145; 162/156; 162/158; 162/160; 162/164.1; 162/164.3; 162/164.6; 162/168.1; 162/169
[58] Field of Search ................ 162/101, 145, 156, 169, 162/168.1, 164.1, 164.3, 164.6, 160, 146, 158

[56] References Cited

U.S. PATENT DOCUMENTS

| | | | |
|---|---|---|---|
| 2,200,815 | 5/1940 | Ackley | 260/309 |
| 2,267,965 | 12/1941 | Wilson | 260/309 |
| 2,268,273 | 12/1941 | Wilkes et al. | 8/142.5 |
| 2,355,837 | 8/1944 | Wilson | 260/309.6 |
| 2,694,633 | 11/1954 | Pattilloch | 162/169 |
| 2,728,972 | 1/1956 | Drummond et al. | 28/1 |
| 2,901,390 | 8/1959 | Conklin et al. | 162/156 |
| 3,016,325 | 1/1962 | Pattilloch | 162/169 |
| 3,036,950 | 5/1962 | Martin | 162/169 |
| 3,109,769 | 11/1963 | Martin | 162/169 |
| 3,269,860 | 8/1966 | Richardson | 162/169 |
| 3,328,234 | 6/1967 | Williams | 162/169 |
| 3,416,990 | 12/1968 | Robinson, Jr. | 161/93 |

(List continued on next page.)

FOREIGN PATENT DOCUMENTS

| | | |
|---|---|---|
| 0300909 | 1/1989 | European Pat. Off. . |
| 0308286 | 3/1989 | European Pat. Off. . |
| 0312414 | 4/1989 | European Pat. Off. . |
| 0341977 | 11/1989 | European Pat. Off. . |
| 0353493 | 2/1990 | European Pat. Off. . |
| 1129757 | 10/1968 | United Kingdom . |
| 1329409 | 9/1973 | United Kingdom . |

OTHER PUBLICATIONS

*The Manufacturing Technology of Continuous Glass Fibres* by K. L. Loewenstein, Elsevier Publishing Company, New York (1973) p. 29.
"A Wet-laid Process for the Preparation of Random Fiber-reinforced Composites", by Larry D. Yats and Michael W. Edens (Aug. 1988) pp. 81-84.
Product Brochures for Naugard 445.
Product Brochure for FinaPolypropylene.
Product Brochure for Irgafos 168.
Product Information on GP2925 Polyamide.
Technical Information for Polycup ® Resins.
"Chemical Treatment for Fibers and Reinforcement for Polymer Matrices Resulting in Good Solvent Resistance", filed Jul. 5, 1988, USSN 07/215,190.
"Polymeric ∝ Containing Compositions with Improved Oxidative Stability", filed Apr. 27, 1990, USSN 07/515,533.

*Primary Examiner*—Peter Chin
*Attorney, Agent, or Firm*—Kenneth J. Stachel

[57] ABSTRACT

A web of nonwoven fibers and thermoplastic matrix polymer is provided that is capable of yielding improved physical properties for articles molded from the web. Also provided are the aqueous dispersion to produce the web and the dried web as a laminate so that it can be molded into shaped articles. The web in addition to the fibers and thermoplastic matrix polymer has a chemically modified thermoplastic polymer. This material can be added to the web by direct addition to the aqueous dispersion or by presence in a mat binder which is applied to the web. Generally, the amount of the chemically modified thermoplastic material present in the web is in the range of around 0.1 to 20 weight percent of the web. When the chemically coupled thermoplastic polymer is added as a mat binder, it can be accompanied by an electron donating organo coupling agent, a stabilizing agent such as one or more carboxylic acids and/or anhydrides which may be monocarboxylic, polycarboxylic aliphatic or cyclic. Additionally, the mat binder can have a film-forming polymer.

16 Claims, No Drawings

U.S. PATENT DOCUMENTS

| | | | |
|---|---|---|---|
| 3,437,550 | 4/1969 | Paul | 161/93 |
| 3,483,276 | 12/1969 | Mahlman | 260/897 |
| 3,597,265 | 8/1971 | Mecklenborg et al. | 117/126 GR |
| 3,716,449 | 2/1973 | Gatward et al. | 162/101 |
| 3,871,952 | 3/1975 | Robertson | 162/101 |
| 4,179,331 | 12/1979 | Chakrabarti | 162/156 |
| 4,265,704 | 5/1981 | nahta | 162/152 |
| 4,308,093 | 12/1981 | Bodendorf et al. | 162/169 |
| 4,358,502 | 11/1982 | Dunbar | 428/283 |
| 4,395,306 | 7/1983 | Killat | 162/156 |
| 4,426,470 | 1/1984 | Wessling et al. | 162/156 |
| 4,481,075 | 11/1984 | Dailly et al. | 162/145 |
| 4,618,401 | 10/1986 | Bodendorf | 162/145 |
| 4,680,223 | 7/1987 | Bither | 162/156 |
| 4,681,805 | 7/1987 | Puckett | 429/391 |
| 4,690,860 | 9/1987 | Radvan et al. | 428/290 |
| 4,728,573 | 3/1988 | Temple | 428/378 |
| 4,882,114 | 11/1989 | Radvan et al. | 264/129 |
| 4,969,975 | 11/1990 | Biggs et al. | 162/101 |

WET LAID FIBEROUS THERMOPLASTIC MATERIAL AND AQUEOUS DISPERSION FOR PRODUCING SAME

This application is a continuation of application Ser. No. 07/622,671, filed Dec. 5, 1990, abandoned.

The present invention is directed to a fiberous-containing material with thermoplastic polymer that can be molded. More particularly, the present invention is directed to a material having a thermoplastic polymer matrix and chopped chemically treated glass fibers, where both the fibers and thermoplastic polymer is prepared into the moldable material by a wet-laid process.

Fiber reinforced plastics include thermoplastic moldable materials and thermosetting moldable materials. The latter includes sheet molding compounds, thick molding compounds and the like that mold through curing. The fiber reinforced thermoplastics mold through flowing the material into a shape as in an injection, compression molding operations. In compression molding a fiber reinforced thermoplastic composite is placed in a mold and stamped to the desired shape. These materials for such an operation are produced in the form of laminates containing the fibers in various forms including chopped strand continuous strand mats and needled mats and mixtures thereof and the thermoplastic polymer matrix combined with the reinforcement through lamination, extradication processes. Also, processes have been developed recently where the reinforcement is combined with the thermoplastic polymer in a wet laid process from an aqueous solution containing the fiberous reinforcement in chopped form and the thermoplastic polymer. In this process, the composite ingredients are combined and mixed in water at low solids concentration and equipment similar to a hydropulper used in the formation of paper from paper pulp. After the slurry is properly mixed, it can be pumped as a thick stock to a holding device where the slurry is further diluted and flocculated and pumped to a head box of a paper machine. Also the slurry can be pumped directed to the head box of the paper machine. From the head box, the composite sheet is formed on a continuous traveling wire mesh. The mesh takes the composite over vacuum sources to remove liquids including water and form the sheet. A mat binder usually polyvinylpyrrolidone is sprayed onto the sheet and the sheet is dried. Representative of such processes are those described in U.S. Pat. Nos. 4,882,114; 3,716,449; 3,871,952, EPO Nos. 0 312 414 and 0 308 286 and 0 341 977.

It is an object of the present invention to provide a wet laid fiber-containing thermoplastic composite or material that has good tensile and flexible properties in the molded article.

SUMMARY OF THE INVENTION

The aforementioned and other objects gleaned from the disclosure herein are provided by the present invention. One aspect of the present invention is the wet-laid web of the nonwoven fiberous mat and the thermoplastic polymer that can be dried into a moldable laminate or sheet, while another aspect of the invention is the dried laminate so produced, and another aspect of the invention is a foamed aqueous dispersion of the discontinuous fibers and thermoplastic matrix polymer with the chemically modified thermoplastic polymer.

The wet-laid web includes: the nonwoven mat of discontinuous glass fibers, thermoplastic matrix polymer, and chemically modified thermoplastic polymer having chemically reactive moieties for addition, condensation or free radical reaction to allow for coupling of the glass fiber to the matrix polymer. The glass fibers have a surface treatment or "size" that allows the fibers to disperse even from the strand form in an aqueous dispersion that does or is to contain the thermoplastic matrix polymer. Dispersion of the fibers can be assisted by surfactants in the size or in the aqueous dispersion. The aqueous dispersion of the glass fibers and thermoplastic matrix polymer can be any white water dispersion or foam dispersion for the wet-laid process of forming a web. The chemically modified thermoplastic polymer can be added as a powder or as pellets to the aqueous dispersion or as an emulsion or dispersion in a mat binder that is applied to the wet laid web of fibers and polymer. The foam aqueous dispersion has sufficient surfactants to assure formation of the foam dispersion. The dried laminate is formed by drying the web that has a reduced moisture content at a temperature elevated from ambient temperatures. The thermoplastic laminate is moldable into shaped articles.

DETAILED DESCRIPTION OF THE INVENTION

In the specification and in the claims, the below-defined terms have the following meanings.

The "white water system" is an aqueous solution in which the glass fibers are dispersed and which can contain numerous dispersants, thickeners, softening, hardening chemicals, or dispersed or emulsified thermoplastic polymers. Examples of various white water systems include aqueous solutions having polyacrylamide polymers such as the Separan polymer available from Dow Chemical Company, alone or with hydroxyethyl cellulose and the like suspending aids to provide a highly viscous aqueous solution at high material concentrations. Also, white water systems include those having any of the numerous amine oxide surfactants as shown in U.S. Pat. No. 4,179,331. An example of the polyacrylamides are those shown in U.S. Pat. No. 4,395,306. In addition to such chemicals as polyacrylamides or amine oxides being present in the white water system, there can also be present small amounts of surfactants such as polyethoxylated derivatives of amide condensation products of fatty acids and polyethylene polyamines as is shown in U.S. Pat. No. 4,265,704. Also numerous other chemical agents can be added to a white water system as is known by those skilled in the art.

The wet-laid process of producing a fiber-containing thermoplastic web involves forming an aqueous dispersion of discontinuous fibers like chopped fibers or chopped strands and the thermoplastic polymer usually with agitation in a mixing tank. The aqueous dispersion, usually referred to as slush or pulping medium, is processed into the wet-laid, sheet-like mat by such machines as cylinder or Fourdrinier machines or more technologically advanced machinery, such as the Stevens Former, Roto Former, Inver Former and the VertiFormer machines. The slush is deposited from a head box onto a moving wire screen or onto the surface of a moving wire-covered cylinder. The slurry on the screen or cylinder is processed into the nonwoven, sheet-like mat by the removal of water, usually by a suction and/or vacuum device, and by the application of a mat binder. Suitable examples of mat binders for application to the web include any material that will affect a bond at a lower temperature than that which would result in consolidation of the plastics material within the structure. Suitable binders include poly(vinyl alcohol), poly(vinyl acetate), carboxymethyl cellulose and starch. Water and excess binder are removed by suction and/or vacuum devices. The web of binder treated nonwoven, sheet-like glass fiber mat and thermoplastic matrix polymer is dried in one or more ovens. The wet-laid process also includes the use of an aqueous foam as the aqueous dispersion to produce the slush rather than a traditional white water. The foam contains the thermoplastic polymer in addition to the glass fibers, along with one or more surfactants and water. This process is more fully discussed in U.S. Pat. Nos. 4,882,114; 4,690,860; and British patent documents 1,129,757 and 1,329,409, all of which are hereby incorporated by reference.

Formation of the aqueous dispersion of the fibers and thermoplastic matrix polymer in accordance with these processes, it is achieved merely by placing the chopped glass fibers whether wet or dried of the desired length into a batch of water with or without the addition of dispersing agents and before or after the addition of the thermoplastic matrix polymer usually with agitation and/or turbulence.

Generally, the foamed aqueous dispersion is prepared with from around 20 to around 60 percent by weight of single discrete fibers having a high modulus mean elasticity and from 40 to 80 percent by weight of the thermoplastic matrix polymer where the matrix polymer has a particle size of less than about 1.5 mm. From this foamed aqueous dispersion in a wet-laid process, a web is formed by laying down the dispersion on a mesh to allow for removal of excess water and application of any mat binder. The web is then transferred to a heating oven. The heating removes residual moisture from the web and also bonds the fibrous and plastic components together into a self-sustained permeable sheet.

In the wet-laid process, the fibers that are used are generally glass fibers but can also be other fibers having a high modulus elasticity including carbon fibers, organic fibers with a high melting point such as Aramides, polyesters and others, glass wool, rock wool and cellulosic fibers. Generally, the amount of the discontinuous fibers in the aqueous dispersion can range from about 0.001 to about 5 and preferably about 0.01 to about 3 weight percent of the aqueous dispersion. Placement of the fibers into the dispersion occurs with or without the use of dispersing agents. When dispersing agents are not added to or are present in the aqueous solution to contain the fibers, the fibers can have a surface treatment that aids in dispersing them in the aqueous dispersion. Suitable examples of chopped glass fibers that can be used are those having a surface treatment having at least one water-soluble, film-forming polymer or copolymer that has an intrinsic viscosity of less than 500 centipoise, a matrix resin compatible organo functional alkoxy silane, wherein the organic moieties is essentially devoid of primary mono-amine functionality and the alkoxy group can range from 1 to 3 and can be hydrolyzed or unhydrolyzed. Also the surface treatment in the undried aqueous form can have a water-soluble, dispersible and/or emulsifiable cationic lubricant and one or or more cationic epichlorohydrin polyamine adducts. Generally, the film-forming copolymer is present in an effective film-forming amount; there again the functional silane is present in an amount from around 0.4 to around 20, the cationic lubricant is present in an amount to around 0.1 to around 15 and the cationic amine polymer epichlorohydrin is present in an amount from around 0.4 to around an amount that is not detrimental to the dispersibility of the treated fibers in water. Particularly suitable treated glass fibers are those having a surface treatment having on a weight percent solids basis around 70 to 80 weight percent of poly(vinylalcohol), around 5 to 10 weight percent cationic lubricant, around 5 to 10 weight percent ureido-modified amino silane, and around 1 to 10 weight percent epichlorohydrin available from Georgia Pacific as GP2925 material. Another suitable example are glass fibers having a surface treatment of a crosslinkable polyurethane film-forming polymer, at least one organo functional silane coupling agent, a copolymer of at least one polymerizable acrylic-type, at least one monomer that is addition polymerizable and matrix-resin miscible and matrix-resin reactable. An example of such a surface treatment is one having the poly(vinyl alcohol) polymer in an amount of around 85 to 95 weight percent of the solids, an amount of a cationic lubricant in an amount of around 0.1 to 1 weight percent of the solids and epichlorohydrin-polyamide adduct like polycup 172 in an amount of around 3 to 10 weight percent and a vinyl organo functional silane like A-151 from Union Carbide Corporation in an amount from around 1 to 8 weight percent and an amount of acetic acid for hydrolyzing the silane. Typically, the amount of surface treatment present on the fibers is in the range from about 0.15 to about 0.45 weight percent of the strands.

The thermoplastic matrix polymer useful in forming the aqueous dispersion and web material is in a particulate form or pelletized form which is then ground into a particular powder form,. Suitable materials include polyethylene, polypropylene, polystyrene, acrylonitrile styrene butadiene, polyethylene terephthalate, poly vinyl chloride, polybutylene terephthalate and plasticized versions thereof. Additional suitable examples of the thermoplastic matrix polymer include polyesters, polyamides, polyphenylene oxide, and polycarbonate. In addition, any thermoplastic powder may be used which is not chemically attacked by water and which can be sufficiently softened by heat to permit fusing and/or molding without being chemically decomposed.

The chemically modified thermoplastic polymer which is used in conjunction with the glass fibers and the thermoplastic matrix polymer is added as a powder or pellet directly to the aqueous dispersion before, after or with the addition of the glass fibers and the thermoplastic matrix polymer. Generally, the particle size of the chemically modified thermoplastic is similar to that of the thermoplastic matrix polymer. A nonexclusive example of a suitable particle size is that in the range of around 100 to 1100 microns. The chemically modified thermoplastic polymer is one having the chemically reactive moieties which can include carboxylic acid and/or carboxylic anhydride modified polyolefins such as maleic anhydride modified polypropylene and maleic acid modified polypropylene and mixtures and blends of these. These types of materials are more fully discussed in U.S. Pat. No. 3,416,990 (Robinson) and U.S. Pat. No. 3,437,550 (Paul) and U.S. Pat. No. 3,483,276 (Mahlman), all of which are hereby incorporated by reference for their teachings concerning the acid modified or anhydride modified polyolefins. Generally, the acid modification involves modifying the polyolefins with carboxylic and/or polycarboxylic acids and/or anhydrides, amines or lower alkyl esters thereof. Another type of chemically modified thermoplastic polymer that can be used are the water soluble, dispersible and/or emulsifiable cationic polyamide polymers with epichlorohydrin adducts. These polyamide-epichlorohydrin adducts generally have a polyamide backbone structure with the epichlorohydrin functionality associated with an amine group in the polymer.

These adducts can be produced by any method known to those skilled in the art. One such method includes the reaction of any polycarboxylic acid, such as succinic acid, maleic acid, terephthalic acid or adipic with polyalkylene polyamine. The resultant long chain polyamide is reacted with epichlorohydrin. The amounts of these materials reacted to produced the adducts is such to yield around 0.9 to about 1.5 moles of epichlorohydrin equivalent of the polyamide. The adduct can have pendent functionality groups similar to the following:

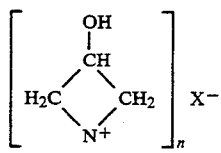

In the above structure, "X" can be chloride ion or any other halogen ion and "n" is an integer representing the number of repeating units in a polymer chain which is a particular value for the Mn of the polymer and the ratio of the moles of the epichlorohydrin functionality to the polyamide functionality. A nonexclusive example of a suitable epichlorohydrin polyamide resin adduct which can be used is that available from Georgia Pacific Company, Resin Division, Atlanta, Ga. under the trade designation GP2925. This polyamide is an amber colored liquid having a percent solids of 20 to 20.6, a viscosity in centistokes of 140 to 200, a specific gravity of 1.04 to 1.05, a weight per gallon in pounds of 8.7, a pH at 25° C. of 6.9 to 7.3, a boiling point of 100° C., a flash point of none to boiling and a storage life at 25° C. of six months. In addition, the polyamide resin may contain a trace of free epichlorohydrin. Another such resin adduct that is suitable is the Polycup 1884, 2002, and/or 172 resin adducts. These materials have total solids by weight percent ranging from 35 to 12.5 and specific gravities at 25° C. from 1.12 to 1.03.

The chemically modified thermoplastic in addition to combination with components to form the aqueous dispersion can be added to the web as the mat binder or along with traditional mat binders. In addition through use of the mat binder, a suitable binder would be that described in U.S. Pat. No. 4,728,573 (hereby incorporated by reference). Generally, these binders have one or more amine organo coupling agents, an aqueous emulsion dispersion of carboxylic-modified polyolefin resin that has been neutralized or nearly neutralized with an organic or inorganic base with or without an aqueous soluble dispersible or emulsifiable film-forming polymer and with or without a binder stabilizer. The basicity of the organic or inorganic base used to neutralize the carboxylic containing polyolefin polymer is less than the basicity or (Kb) or any amino group of the coupling agent. For instance, the acid modified polyolefin can be neutralized with a base having a pKb or basicity similar to that of diethyl ethanolamine. Such a binder material would have present on a weight percent solids basis up to 100 percent of the solids of the chemically modified thermoplastic polymer, from 0 to about 50 percent weight solids of the organic coupling agent capable of donating electrons and from 0 to 25 weight percent of the solids of the mono-, poly-, aliphatic or cyclic carboxylic acid and/or anhydride and from 0 to around 30 weight percent of a film-forming polymer. Useful film-forming polymers include epoxy polymers from epoxy emulsions, polyurethane polymers from polyurethane emulsions and epoxy polyurethane copolymers from such emulsions and polyvinyl pyrrolidone and mixtures and blends of these.

Another suitable example of a mat binder includes a polymer that is thermoplastic or thermoserring such as: a polyurethane, including polyester urethane and polyether urethane and polyurea-urethane, polyoxyalkylene like poly(oxyethylene-oxypropylene) copolymers and thermoplastic polymers. The polymeric composition also has effective stabilizing amounts of stabilizing agents selected from: metal deactivating agents such as polydentate ligands like ethylenediaminetetraacetic acid (EDTA), low temperature anti-oxidant, and higher temperature anti-oxidant. Additionally, a crosslinking agent may be present.

A suitable example is a binder having:
a. at least one matrix-compatible film-forming polymer in an effective film-forming amount,
b. at least one organofunctional silane coupling agent selected from the group consisting of aminoalkyl alkoxysilanes, polyaminoalkyl alkoxysilanes in an effective coupling agent amount,
c. at least two stabilizing agents selected from:
  i. a metal deactivating agent selected from polydentate ligands and those having the following formula:

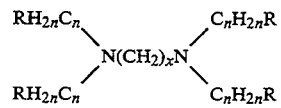

ii. lower temperature anti-oxidant selected from: hydrosulfite, bisulfite, phosphorous acid, phosphite and phosphite-containing reducing agent selected from the group consisting of alkali metal hypophosphites, alkaline earth metal hypophosphites, hydrogen phosphites and ammonium hypophosphite in an effective antioxidant amount,
  iii. higher temperature anti-oxidant selected from alkali metal phenyl phosphinates and alkaline earth metal phenyl phosphonates, and phenyl-containing thioethers and polymers thereof, thiodipropionate like di(tridecyl)thiodipropionate and mixtures thereof in an effective anti-oxidant amount.

One particular formulation of such a binder is:

| | Solids % |
|---|---|
| Oil-in-water emulsion of the curable matrix-compatible polyurethane film forming polymer | 40–70 |
| Water for polymer emulsion | |
| A-1100 gamma-aminopropyltriethoxy silane | 62 |
| Water for A-1100 | |
| Hampene NA2 disodium ethylene diamine tetraacetate | 100 |
| Sodium Hypophosphite | 100 |
| Water for Hampene and Hypophosphite | |

|  | Solids % |
|---|---|
| RD-1135B epoxidized polyester | 20 |
| Evanstab 13 (Di(Tridecyl)thiodipropionate | 100 |
| Baybond XW-116 (blocked aliphatic polyisocyanate crosslinker) | 70 |
| Hot water for Baybond |  |
| Rhoplex E-693 acrylic copolymer | 50 |
| Water for Rhoplex |  |
| Water for dilution to 100 gallons |  |
| % Solids: | 9.0 ± 0.3 |
| pH: | 10 ± 0.5 |
| Viscosity: (cp)* | 3 ± 1 |
| Temperature (°F.) | 80 ± 10 |

*cp = centipoise

The binder can be formulated by adding the polymer latices to premix tanks with slow stirring and the addition of about 1/5 of the total volume of water as deionized water. In this formulation as acrylic copolymer latex is used which assists in producing improved solvent resistance for reinforcing polyamide. The Rhoplex E-693 material is available from Rohm and Haas Co., Philadelphia, Pa. This material is a white emulsion having a solids content of 49.5 to 50.5 percent with a pH of 4.5 to 6.5 and a viscosity at LVT (1), 60 rpm 20–60. This copolymer is a self-crosslinking acrylic-type copolymer of the anionic emulsifying type with a density at 20° C. of 8.8 pounds per gallon and minimum film-forming temperature of ±12° C. and a temperature at which the torsional modulus of an air dried film is 300 kilograms per centimeter$^2$ of +24° C. About 2/5 of the total volume of water is added to a main mix tank and the amtno organofunctional silane is added to this deionized water with slow stirring. The polymer latex premixes are added to the silane mixture in the main mix and stirred for five minutes and added to the main mix tank. The polyisocyanate crosslinking agent is added to a premix tank and has added to it hot water with stirring. After the emulsion forms, it is stirred for five minutes and then added to the main mix tank. The acrylic copolymer is added to a premix tank with a small amount of water, around 1/30 of the total volume of water needed for the chemical treating composition and the mixture is stirred for five minutes and added to the main mix tank. The aqueous chemical treating composition is diluted with deionized water to its final desired volume.

The aforementioned various mat binders are formulated to have a solids content in the range of around 0.1 to 32 weight percent and preferably around 5 to around 18 weight percent. The mat binders are applied to the web of nonwoven fibers and thermoplastic matrix polymer without any method known to those skilled in the art for applying mat binders. This is referred to applying the binder by spraying the web after most of the water from the slush has been removed on the mesh or screen of the wet-laid process. The mat binder can have from 0 to 5 weight percent of the fiberous material of an electron donating organo coupling agent, from 0 to around 3 weight percent of the material of any moiety selected from the group consisting of mono-, poly-, aliphatic, and cyclic carboxylic acid and anhydride, and from 0 to around 4 weight percent of the material of film forming thermoplastic polymer and an effective stabilizing amount of one or more stabilizing agents.

The amounts of the glass fiber thermoplastic matrix polymer and chemically modified thermoplastic polymer present in the web produced by the wet-laid process can be in the following ranges. The nonwoven mat can range from 1 to 50 weight percent of the web; the thermoplastic matrix polymer can range from around 50 to 99 weight percent of the web; and the chemically modified thermoplastic polymer can range from around 0.01 to around 20 weight percent of the web. When the mat binder is used in conjunction with the chemically modified thermoplastic polymer, the mat binder can range from around 0.01 to around 20 weight percent of the web where the amount of the nonwoven fiber and thermoplastic matrix polymer both are present in a greater amount than the binder. Higher amounts of the binder are used when the chemically modified thermoplastic polymer is added with the mat binder. Generally, the amount of chemically modified thermoplastic polymer present in the web varies to a degree with the amount of chemical modification of the thermoplastic polymer. Suitable examples of materials that can be added directly to the slush include the Hercoprime material available from Himont and the Excelor material available from Exxon Chemical Company. The latter material is used in an amount greater than the former since the former appears to have a greater degree of functionality. The amount for the former preferably ranges from around 0.1 to 5 weight percent of the web and the amount for the latter can range from 0.1 to 16 weight percent of the web. The amounts of the glass fiber matrix compatible thermoplastic polymer and chemically modified thermoplastic polymer added to the slush or slurry or aqueous stock are those that enable production of a web with the aforementioned amounts of these materials. The amount of water in the slush is a predominant amount and ranges in the order of 80 to 99 weight percent of the slush.

With formation of the web having the chemically modified thermoplastic polymer, the web is dried to further reduce the moisture and to initiate some degree of reaction between the chemically modified thermoplastic polymer and the fibers. Typically, the drying occurs in an oven at an elevated temperature above ambient and generally in a temperature above the melting point of the thermoplastic matrix polymer. For example, when the thermoplastic polymer is a polypropylene the drying temperature can be by hot air and around 100° to 240° C., preferably around 120° C. to 180° C. A suitable oven is a drying oven manufactured by Honeycomb Engineering Company.

The various aspects of the invention will be illustrated in the following examples.

Example 1

In the preferred embodiment of the present invention, a wet-laid nonwoven web with thermoplastic polymer having a grammage equal to 1000 grams per meter$^2$ and the components of Table 1 below was formed. The manner of forming the web was that similar to the methods described in U.S. Pat. No. 4,882,114.

TABLE 1

| Fina 3860 Homopolymer of Polypropylene Melt Flow Index = 75 grams/10 minutes | 66 percent |
|---|---|
| Irgafos 168 Phosphate Antioxidant | 3 percent |
| Naugard 445 Aromatic Amine Anti-oxidant | 1 percent |
| ½ inch glass fiber strands | 30 percent |

The weight percent of Table 1 is that of the formulation composition. The glass fibers in the strands had a diameter of 16 microns and had a chemical treatment at a level of 0.30 percent by weight of the strand, where the treatment was an aqueous chemical composition composed of the following solids:

| SIZE TREATMENT | I | II |
|---|---|---|
| Poly(vinylalcohol) Vinol 205 | 77.5 | 88.6 |
| Cationic lubricant (Cat-X lubricant) | 7.04 | 0.54 |
| Ureido-modified aminosilane | 8.04 | — |
| Vinylorganofunctional silane A151 | — | 4.21 |
| Epichlorohydrin-polyamide adduct (CP 2935) | 7.4 | 6.68 (Polycup 172) |

The resultant nonwoven web (Grammage=1000 g/m$^2$) comprised of 66 percent Fina 3860, 3 percent Irgafos 168, 1 percent Naugard 445 and 30 percent glass fibers I was treated at a level 0.86 percent by weight with an aqueous chemical composition comprised of:

| | |
|---|---|
| 75% | Protolube 5440 Maleic acid, Modified polypropylene emulsion from National Starch |
| 12.8% | A-1100 gamma aminopropyltriethoxysilane from Union Carbide Corporation |
| 5.1% | Maleic acid (General Chemical Corp.) |
| 1.2% | Epirez W60-5520 epoxy polyurethane dispersion available from Rhone-Poulene |
| 0.1% | Antifoam 1430 available from Dow Corning Corp. |

% based on total dry solids.

Added to the web in conjunction with the web binder was a carbon black dispersion at a level of 0.1%. The resultant treated web was dried to 0% moisture at a temperature of 300° F. Four dried sheets were stacked and laminated at 420° F., 25 psi for 3.5 minutes. The resultant laminate was cooled at full pressure for 13 minutes. Said laminate was compression molded by heating it to 460° F. for 6 minutes. then shaping a flat panel at 100 tons pressure. The resultant molded panel was cut and tested in accordance with ASTM Procedures for Tensile, Flex and Izod Impact and the values are shown in the following table. The values stated for strength and modulus are normalized to a 30 percent glass loading by weight. This adjustment is accomplished by first determining the actual glass content via an ashing technique then determine the percentage difference between the nominal and actual volume percent glass and multiplying that percentage difference by the strength or modulus value measured. This procedure is carried out for all strength and modulus values reported since webs might vary in glass content by 1 or 2 percent by weight.

| | Exp. Results | | | |
|---|---|---|---|---|
| | Ten Str. (psi) | Flex Str. (psi) | Flex MOD (psi) | Izod Imp. (Ft-lbs/In) |
| Composition Formulation: | 12,400 | 18,200 | 728,900 | 7.70 |

Examples 2–21 and Illustrative A and B

Twenty-one wet laid webs and two illustrative wet laid webs were prepared from components shown in Table 2. The Illustrative examples are indicated as A–B, where Illustrative Examples A and B were made in a manner similar to Example 1, except that poly(vinylpyrrolidone) was the mat binder. Illustrative example A was prepared in a manner similar to Illustrative Example B but without the presence of carbon black. Examples 2 and 3 were prepared in a manner similar to that of Example 1, but carbon black was not used. Examples 4–7 were prepared in a manner similar to that of Example 1 with one of two mat binders and without carbon black. In addition, examples 4–7 and 8 had an addition of the chemically modified polypropylene to the aqueous slush. Also examples 8–23 were prepared in a manner similar to Example 1 with the presence of carbon black and examples 8–12 varied the type of mat binder. Examples 13–20 were prepared in a manner similar to Example 1 but with the addition of the chemically modified polypropylene either to the slush as Hercoprime polypropylene or to the mat binder as Protolube 5440 polypropylene emulsion. In these examples the following components were used:

| | |
|---|---|
| PVP K-90: | Polyvinyl pyrrolidone, MW = 660,000 |
| Hercoprime G: | Maleic anhydride, Modified Polypropylene |
| Hercoprime HG 201: | Maleic anhydride, Modified Polypropylene |
| Protolube 5440: | Maleic acid, Modified Propylene |
| Profax 6201: | Homopolymer of Polypropylene Melt Flow Index = 20 grams/10 minutes Weight Average MW = 210,000 |
| Fina 3860: | Homopolymer of Polypropylene Melt Flow Index = 75 grams/10 minutes |
| Irgafos 168: | Phosphate Type: Antioxidant which is Tris(2,4-Di-tert-butylphenyl) Phosphate |
| Naugard 445: | Aromatic Amine Type: Antioxidant which is 4,4'Di(2,2-dimethylbenzyl)diphenylamine |

Glass fiber sample A ½ inch length and 16 um fiber diameter Size Treatment I.
Glass fiber sample B ½ inch length 16 um fiber diameter with a surface treatment of Size Treatment II.
In examples 2–4, 6, 8, 14, 16, 18 and 20 the mat binder formulation that was used was that as used in example 1 as did examples 15, 17, 19 and 21 with the addition of more of the Protolube 5440 emulsion. Examples 5, 7, 9, and 11 used the mat binder formulation indicated below as "Formulation I". Examples 10 and 12 used the mat binder formulation indicated below as "Formulation II".

Formulation I

| | % by Actual Solids |
|---|---|
| Rucothane 20116 Polyurethane | 56.65 |
| A-1100 | 5.34 |
| EDTA | 0.31 |
| RD-1135b | 5.34 |
| Evan Stab 13 | 3.35 |
| Sodium Hypophosphite | 1.68 |
| XW-116 M | 8.27 |
| Rhoplex E-693 | 19.06 |

Carbon black: Black pigment.

Formulation II

In the formulation for the mat binder of Example 1 the chemically modified polypropylene was removed and replaced with Rucothane 2011L polyurethane oil-in-water emulsion and it had the following formulation:

| | % by Actual Solids |
|---|---|
| Rucothane 2011L | 51.5% |
| A-1100 | 24.6% |
| Maleic acid | 9.8% |

-continued

|  | % by Actual Solids |
| --- | --- |
| Epirez W60-5520 | 14.0% |
| Anti-foam 1430 | 0.1% |

Formulation III

|  | % by Actual Solids |
| --- | --- |
| Protolube 5440 | 51.5 |
| A-1100 | 24.6 |
| Maleic acid | 9.8 |
| Epirez W60-5520 | 14.0 |
| Antifoam 1430 | 0.1 |

TABLE 2

| Ingredients | A | B | 2 | 3 | 4 | 5 | 6 | 7 | 8 | 9 | 10 | 11 | 12 |
| --- | --- | --- | --- | --- | --- | --- | --- | --- | --- | --- | --- | --- | --- |
| Profax 6201 | 66 | 66 | 66 | — | 66 | 66 | — | — | — | — | — | — | — |
| Fina 3860 | — | — | — | 66 | — | — | 66 | 66 | 66 | 66 | 66 | 66 | 66 |
| Irgafos 168 | 3 | 3 | 3 | 3 | 3 | 3 | 3 | 3 | 3 | 3 | 3 | 3 | 3 |
| Naugard 445 | 1 | 1 | 1 | 1 | 1 | 1 | 1 | 1 | 1 | 1 | 1 | 1 | 1 |
| Glass fibers II | 30 | 30 | — | — | — | — | — | — | — | — | — | — | — |
| Glass fibers I | — | — | 30 | 30 | 30 | 30 | 30 | 30 | 30 | 30 | 30 | 30 | 30 |
| Fomulation I | — | — | — | — | — | 0.41 | — | 0.41 | — | 0.41 | — | 0.41 | — |
| Formulation III | — | — | 0.41 | 0.41 | 0.41 | — | 0.41 | — | 0.41 | — | — | — | — |
| PVP K-90 | 0.41 | 0.41 | — | — | — | — | — | — | — | — | — | — | — |
| Hercoprime G | — | — | — | — | 4.0 | 4.0 | 4.0 | 4.0 | 1.0 | 1.0 | 1.0 | — | — |
| Hercoprime HG201 | — | — | — | — | — | — | — | — | — | — | — | — | — |
| Protolube 5440 | — | — | — | — | — | — | — | — | — | — | — | — | — |
| Formulation II | — | — | — | — | — | — | — | — | — | — | 0.41 | — | 0.41 |
| Carbon Black | — | 0.41 | — | — | — | — | — | — | 0.41 | 0.41 | 0.41 | 0.41 | 0.41 |

| Ingredients | 13 | 14 | 15 | 16 | 17 | 18 | 19 | 20 | 21 | 22 |
| --- | --- | --- | --- | --- | --- | --- | --- | --- | --- | --- |
| Fina 3860 | 66 | 66 | 66 | 66 | 66 | 66 | 66 | 66 | 66 | 66 |
| Glass fibers I | 30 | 30 | 30 | 30 | 30 | 30 | 30 | 30 | 30 | 30 |
| Irgafos 168 | 3 | 3 | 3 | 3 | 3 | 3 | 3 | 3 | 3 | 3 |
| Naugard 445 | 1 | 1 | 1 | 1 | 1 | 1 | 1 | 1 | 1 | 1 |
| Carbon Black | 0.21 | 0.21 | 0.21 | 0.21 | 0.21 | 0.21 | 0.21 | 0.21 | 0.21 | 0.21 |
| Formulation III | 0.29 | 0.29 | 0.62 | 0.62 | 0.29 | 0.29 | 0.62 | 0.62 | 0.29 | 0.14 |
| Hercoprime HG201 | 1.0 | — | 1.0 | — | 1.0 | — | 1.0 | — | — | — |
| Protolube 5440 | — | 0.41 | — | 0.41 | — | 0.41 | — | 0.41 | — | — |

The wet laid nonwoven material with the thermoplastic polymer produced in Table 2 were molded under conditions similar to that of Example 1. The molded samples were tested in a manner similar to those of example 1 for tensile, flexural and impact properties. These test results are presented in Table 3.

TABLE 3

| | EXPERIMENTAL RESULTS | | | |
| --- | --- | --- | --- | --- |
| COMPOSITE FORMULATION | TEN STR. MD/CMD (PSI) | FLEX STR. MD/CMD (PSI) | FLEX MOD. MD/CMD (PSI) | IZOD IMP. MD/CMD (FT-LBS/IN) |
| 1 | 13,700 | 16,700 | 697,000 | 15.2 |
|  | 8,100 | 16,000 | 610,900 | 9.9 |
| AVG | 10,900 | 16,400 | 654,000 | 12.6 |
| 2 | 15,800 | 18,400 | 692,300 | 16.0 |
|  | 11,100 | 16,600 | 597,000 | 10.0 |
| AVG | 13,500 | 17,500 | 644,700 | 13.0 |
| 3 | 18,600 | 20,900 | 816,000 | 15.6 |
|  | 11,900 | 17,300 | 642,800 | 9.5 |
| AVG | 15,300 | 19,100 | 729,400 | 12.6 |
| 4 | 18,400 | 24,900 | 887,500 | 7.1 |
|  | 12,200 | 18,700 | 653,000 | 5.6 |
| AVG | 15,300 | 21,800 | 770,300 | 6.4 |
| 5 | 17,000 | 22,100 | 816,800 | 6.9 |
|  | 13,300 | 17,400 | 616,300 | 5.5 |
| AVG | 15,200 | 19,800 | 716,600 | 6.4 |
| 6 | 18,000 | 23,200 | 814,900 | 7.6 |
|  | 11,100 | 17,000 | 626,300 | 5.5 |
| AVG | 14,600 | 20,100 | 720,600 | 6.6 |
| 7 | 17,600 | 22,000 | 775,100 | 7.5 |
|  | 16,700 | 18,700 | 656,100 | 5.7 |
| AVG | 17,200 | 20,400 | 715,600 | 6.2 |
| 8 | 13,800 | 19,300 | 798,200 | 6.81 |
|  | 9,400 | 16,600 | 589,500 | 5.60 |
| AVG | 11,600 | 17,900 | 693,800 | 6.20 |
| 9 | 13,000 | 18,400 | 754,600 | 5.80 |
|  | 8,800 | 11,900 | 448,200 | 4.40 |
| AVG | 10,900 | 15,200 | 601,400 | 5.10 |
| 10 | 10,300 | 16,200 | 717,500 | 6.60 |
|  | 8,600 | 14,200 | 548,000 | 5.20 |
| AVG | 9,500 | 15,200 | 632,700 | 5.90 |
| 11 | 11,100 | 15,400 | 730,800 | 9.90 |
|  | 7,400 | 11,900 | 503,500 | 6.50 |
| AVG | 9,300 | 13,600 | 617,200 | 8.20 |
| 12 | 10,100 | 18,500 | 791,700 | 9.20 |
|  | 8,900 | 12,600 | 496,700 | 7.10 |

| | | | | | Adjusted Physical Properties | | | |
| --- | --- | --- | --- | --- | --- | --- | --- | --- |
| | | | | | TRIAL # | TEN STR. MD/CMD | FLEX STR. MD/CMD | FLEX MOD. MD/CMD | IZOD IMP. MD/CMD |
| AVG | 9,500 | 15,600 | 644,200 | 8.20 | | | | |
| 13 | 9,500 | 16,400 | 737,100 | 8.80 | | | | |
|  | 7,100 | 13,500 | 531,800 | 6.80 | | | | |
| AVG | 8,300 | 15,000 | 634,500 | 7.80 | | | | |
| 1 | 13,700 | 16,700 | 697,000 | 15.20 | | | | |
|  | 8,100 | 16,000 | 610,900 | 9.90 | | | | |
| AVG | 10,900 | 16,400 | 654,000 | 12.60 | | | | |

| TRIAL # | TEN STR. MD/CMD | FLEX STR. MD/CMD | FLEX MOD. MD/CMD | IZOD IMP. MD/CMD |
| --- | --- | --- | --- | --- |
| 14 | 13,200 | 17,100 | 681,400 | 8.20 |
|  | 8,700 | 17,000 | 698,400 | 5.90 |
| AVG | 11,000 | 17,100 | 689,000 | 7.10 |
| 15 | 15,200 | 20,800 | 838,900 | 10.10 |
|  | 8,000 | 13,140 | 534,600 | 6.50 |
| AVG | 11,600 | 17,000 | 681,800 | 8.30 |
| 16 | 13,000 | 18,900 | 822,300 | 8.20 |
|  | 8,600 | 13,700 | 548,500 | 7.30 |
| AVG | 10,800 | 16,300 | 685,400 | 7.80 |
| 17 | 13,500 | 21,700 | 863,900 | 10.30 |
|  | 8,500 | 15,000 | 637,100 | 6.20 |
| AVG | 11,000 | 18,400 | 750,500 | 8.30 |
| 18 | 14,500 | 21,900 | 897,400 | 6.90 |
|  | 10,300 | 18,400 | 671,600 | 5.80 |
| AVG | 12,400 | 20,200 | 784,500 | 6.40 |
| 19 | 14,100 | 25,800 | 990,100 | 7.40 |
|  | 8,200 | 16,100 | 596,800 | 5.50 |
| AVG | 11,200 | 21,000 | 793,500 | 6.50 |
| 20 | 16,700 | 22,000 | 890,300 | 5.30 |
|  | 7,400 | 13,300 | 515,200 | 5.10 |

TABLE 3-continued

| | | | | |
|---|---|---|---|---|
| AVG | 12,100 | 17,700 | 702,800 | 5.20 |
| 21 | 15,600 | 22,700 | 951,400 | 8.80 |
| | 9,100 | 13,600 | 506,300 | 6.50 |
| AVG | 12,400 | 18,200 | 728,900 | 7.70 |
| | | | | 9.751 |
| 22 | 12,600 | 19,800 | 866,700 | 7.709 |
| | | | | 6.808 |
| | 7,300 | 17,100 | 645,900 | 5.909 |
| AVG | 10,000 | 18,500 | 756,300 | 7.60 |
| 23 | 14,400 | 18,200 | 791,900 | 10.02 |
| | 7,900 | 14,900 | 584,800 | 6.20 |
| AVG | 11,200 | 16,600 | 688,400 | 8.10 |

It can be concluded from the study that composite physical properties improve as the melt flow index of the resin matrix is increased and that strength and modulus properties improve but impact performance decreases with the addition of 4 percent maleic anhydride modified polypropylene. The impact performance is reduced significantly because the low molecular weight additive tends to imbrittle the resin matrix thereby reducing the composites ability to absorb energy during impact. At a 1 percent loading the maleic anhydride modified polypropylene additive offers benefits to all performance criteria. It can also be concluded from the study that chemical formulation III gives the best properties of any chemical formulation studied plus the lower the level of carbon black present the better the overall physical properties performance will be. Finally, it was determined that maleic acid and maleic anhydride modified polypropylene could be used interchangeable as part of the composite formulations.

I claim:

1. A process of forming a wet-laid, non-woven, glass fiber containing thermoplastic polymer web that is moldable as a fiber reinforced thermoplastic laminate, comprising:
   A. forming an aqueous dispersion containing:
      1. a particulate or particulate powder thermoplastic matrix polymer selected from the group consisting of polyolefins, polyesters, polyamides, polyphenylene oxide and polycarbonate, the matrix polymer constituting from 50 to 99 percent of the wet-laid web and present throughout and on the fibers of the web;
      2. glass fibers of noncontinuous lengths treated with a forming size containing a film forming polymer compatible with the matrix polymer, an organo coupling agent and cationic lubricant, wherein the size allows the glass fibers to disperse in the aqueous dispersion from which the wet laid web is formed, the glass fibers constituting from 1 to 50 percent of the wet-laid web;
   B. depositing the aqueous dispersion onto a screen and removing water to form a non-woven, sheet-like, fiber containing thermoplastic polymer mat; and
   C. applying to the non-woven mat a mat binder having a solids content from around 0.1 to 32 weight percent and consisting essentially of:
      1) a chemically modified thermoplastic polymer, constituting from around 0.01 to around 20 weight percent of the wet-laid web, containing chemically reactive moieties for addition, condensation or free radical reaction to allow for coupling of the fibers to the matrix polymer, selected from the group consisting of carboxylic acid modified polyolefins, carboxylic anhydride modified polyolefins, mixtures and blends of these;
      2) film forming polymer in a positive amount not exceeding 4 weight percent of the wet-laid web selected from the group consisting of polyurethane, epoxy, epoxy-polyurethane and polyoxyalkylene;
      3) from 0 to about 5 weight percent of the wet-laid web of an electron donating organo coupling agent; and
      4) from 0 to about 3 weight percent of the wet-laid web of a compound selected from aliphatic or cyclic mono- or polycarboxylic acids and anhydrides thereof;
   D. drying the sheet-like web to form the wet-laid, non-woven fiber containing thermoplastic polymer web.

2. The process of claim 1 wherein the thermoplastic matrix polymer is polypropylene.

3. The process of claim 1 wherein the film-forming polymer of the mat binder is a thermoplastic polymer.

4. The process of claim 1 wherein the mat binder additionally contains an effective stabilizing amount of a stabilizing agent selected from metal deactivating agents and antioxidants.

5. The process of claim 4 wherein the stabilizing agent is an antioxidant selected from thioester type antioxidants, phosphite type antioxidants, aromatic amine type antioxidants and combinations of these.

6. The process of claim 1 wherein the aqueous dispersion is a foamed aqueous dispersion of the glass fibers and matrix polymer with surfactant.

7. The wet-laid web of claim 1 wherein the chemically modified thermoplastic polymer is present as an emulsion or dispersion in the mat binder.

8. The process of claim 7 wherein, in the mat binder, the organo coupling agent is an amine organo coupling agent having a primary amine with basicity (pKb) greater than diethyl ethanolamine; the chemically modified thermoplastic polymer is an aqueous emulsion of surfactant and maleic acid or maleic anhydride modified polypropylene, the acid neutralized with amine having basicity similar to diethyl ethanolamine, the emulsion of maleic acid or maleic anhydride modified polypropylene present in an amount such that polypropylene constitutes the predominant solids of the mat binder; and the film former is an aqueous dispersion selected from water soluble, dispersible or emulsifiable polyurethane, epoxy, and epoxy-polyurethane, present in the mat binder in an amount less than the polypropylene emulsion.

9. The process of claim 1 wherein the film forming polymer of the glass fiber forming size is a crosslinkable polyurethane, the organo coupling agent is an organofunctional silane or its hydrolysis products and the forming size further contains an effective film forming amount of a copolymer of an acrylic type monomer that is addition polymerizable, matrix resin-miscible and matrix resin-reactable.

10. The process of claim 1 wherein the glass fiber forming size contains:
   1. water soluble film forming polymer having an intrinsic viscosity of less than about 150 centipoise selected from poly(vinyl alcohol) polymer with weight average molecular weight ranging from about 22,000 to greater than 105,000, poly(vinylpyrrolidone), poly(hydroxy alkyl cellulose) and copolymers of monomers for preparing these polymers, wherein the polymer is present in an amount up to about 98 weight percent of the solids of the composition;
2. ureido organo-functional trialkoxy silane, its hydrolysis products and mixtures thereof, wherein the organo functionality is resin compatible and wherein the silane in all of its forms is present in an amount in the range of about 0.4 to about 20 weight percent of the solids of the composition;
3. cationic lubricant in an amount in the range of about 0.1 to about 15 weight percent of the solids of the composition; and
4. epichlorohydrin polyamide reaction product present in an amount in the range from about 0.4 to an amount not detrimental to the dispersibility of the treated fibers in water.

11. The process of claim 1 herein the glass fiber forming size contains:
1. water soluble film forming polymer having an intrinsic viscosity of less than about 150 centipoise selected from poly(vinyl alcohol) polymer having weight average molecular weight ranging from about 22,000 to greater than 105,000, poly(vinylpyrrolidone), poly(hydroxy alkyl cellulose) and copolymers of monomers for preparing these polymers, wherein the polymer is present in an amount up to about 98 weight percent of the solids of the composition;
2. vinyl organo-functional trialkoxy silane, its hydrolysis products and mixtures thereof, wherein the organo functionality is resin compatible and wherein the silane in all of its forms is present in an amount in the range of about 0.4 to about 20 weight percent of the solids of the composition;
3. cationic lubricant in an amount in the range of about 0.1 to about 15 weight percent of the solids of the composition; and
4. epoxy functional polyamide present in an amount in the range from about 0.4 to an amount not detrimental to the dispersibility of the treated fibers in water.

12. The process of claim 1 wherein the forming size of the glass fiber is present in an amount in the range of about 0.15 to about 0.45 weight percent of the strand, 13. A wet-laid, non-woven, glass fiber containing thermoplastic polymer web prepared according to the process of claim 1.

14. A wet-laid, nonwoven, glass fiber containing thermoplastic polymer web prepared by the process of claim 6.

15. A wet-laid, nonwoven, glass fiber containing thermoplastic polymer web prepared by the process of claim 11.

16. A wet, laid, nonwoven glass fiber containing thermoplastic polymer web prepared by the process of claim 12.

* * * * *

UNITED STATES PATENT AND TRADEMARK OFFICE
CERTIFICATE OF CORRECTION

PATENT NO. : 5,393,379
DATED : February 28, 1995
INVENTOR(S) : Luciano M. Parrinello It is certified that error appears in the above-indentified patent and that said Letters Patent is hereby corrected as shown below:

Claim 11, column 15, line 18, delete the word "herein" and insert --wherein--.

Signed and Sealed this

Thirteenth Day of August, 1996

*Attest:*

BRUCE LEHMAN

*Attesting Officer*         *Commissioner of Patents and Trademarks*